(12) United States Patent
Huang

(10) Patent No.: US 7,340,117 B2
(45) Date of Patent: Mar. 4, 2008

(54) BROAD-BAND FIBER-OPTIC WAVE PLATES

(76) Inventor: Hung-Chia Huang, Apt. 401, No. 39, 511 Lane Wu-Zhong Road, Shanghai (CN) 201103

(*) Notice: Subject to any disclaimer, the term of this patent is extended or adjusted under 35 U.S.C. 154(b) by 0 days.

(21) Appl. No.: 11/735,665

(22) Filed: Apr. 16, 2007

(65) Prior Publication Data
US 2007/0183706 A1 Aug. 9, 2007

Related U.S. Application Data

(62) Division of application No. 10/919,972, filed on Aug. 17, 2004, now Pat. No. 7,206,468.

(51) Int. Cl.
*G02B 6/00* (2006.01)
(52) U.S. Cl. ........................................................ 385/11
(58) Field of Classification Search .................... 385/11
See application file for complete search history.

(56) References Cited

U.S. PATENT DOCUMENTS

| | | | |
|---|---|---|---|
| 4,389,090 | A | 6/1983 | LeFevre |
| 4,943,132 | A | 7/1990 | Huang |
| 5,096,312 | A | 3/1992 | Huang |
| 5,452,394 | A | 9/1995 | Huang |
| 6,188,811 | B1 | 2/2001 | Blake |
| 6,229,937 | B1 | 5/2001 | Nolan et al. |

OTHER PUBLICATIONS

Huang, Hung-Chia, "Asymptotic approach to solving highly irregular problems in special fiber optics", Surv. Math. Ind. (2001) 10: 1-21.
Huang, Hung-Chia, "Weak coupling theory of optical fiber and film waveguides", Radio Science, vol. 16, No. 4, pp. 495-499 Jul.-Aug. 1981.
Huang, Hung-Chia, "Coupled Modes and Nonideal Waveguides", Microwave Research Institute, Polytechnic Institute Institute of New York, 191 pgs. 1981.

*Primary Examiner*—Frank G. Font
*Assistant Examiner*—Mary El-Shammaa
(74) *Attorney, Agent, or Firm*—Dorsey & Whitney LLP

(57) ABSTRACT

A section of birefringent optical fiber spun at a slowly varying spin-rate from zero to a high value, or vice versa, behaves as a fiber-optic quarter wave plate in polarization transforms. Despite this similarity in SOP transforms with its bulk-optic counterpart which is narrow-band, this invention works on an entirely different mechanism that favorably makes the invention broad-band. Using different spin-rate functions, the invention is extended to include broad-band fiber-optic half wave, full wave, and fractional wave plates, capable of performing polarization transforms like the respective bulk-optic counterparts. Fabrication of the invented broad-band fiber-optic wave plates can be performed in the conventional way by using a birefringent preform drawn by a fiber-drawing tower incorporated with a variable-speed spinner on top of the setup. A nonconventional way is to use the moving microheater technique, devised by the same inventor, using a length of birefringent fiber as the starting material. The invention finds immediate and potential applications in all-fiber optical circuitry, an electric current sensing architecture for example, wherein circular light is used along with linear light.

7 Claims, 4 Drawing Sheets

BROAD-BAND FIBER-OPTIC WAVE PLATES

CROSS-REFERENCE TO RELATED APPLICATION

This Application is a divisional of U.S. Ser. No. 10/919,972, filed Aug. 17, 2004, now U.S. Pat. No. 7,206,468 the subject matter of which is hereby incorporated by reference in its entirety.

BACKGROUND OF THE INVENTION

1. Field of the Invention

This invention relates to polarization-transforming fiber, specialized fiber, polarization optics in specialized fiber, optical fiber circuitry and networks involving use of circular light, all-fiber optical architecture for gyroscope, electric-current sensor, and coherence optical fiber communication, fiber-optic interferometers, Sagnac interferometer, etc. In particular, this invention relates to broad-band fiber-optic wave plates.

2. Description of the Related Art

In any optics laboratory, conventional bulk-optic wave plates are versatile elements widely used in lightwave experiment. Thus, a bulk-optic quarter wave plate is commonly used to convert a linear light into a circular light, or conversely a circular light into a linear light. A bulk-optic half wave plate is commonly used to change the orientation of a linear light. In modern fiber-optic systems, while such bulk-optic wave plates can be incorporated with the optical fiber circuitry to perform a prescribed state-of-polarization (SOP) transform function, the overall composite layout is likely bulky and vibration-sensitive, requiring careful and deliberate manual tuning and adjustments in maintenance of the system operation. More remarkably, a bulk-optic wave plate structured by a calcite crystal of precise thickness is inherently narrow-band, and this is oftentimes a restrictive feature for its inclusion in modern optical fiber communication and sensor technology. As well-known, the narrow-band inherence of a conventional bulk-optic wave plate is due to the fact that this optical element made by a calcite crystal works on the principle that the o-wave and the e-wave (o, e, short for ordinary and extraordinary) acquire a precisely specified phase difference in passing the element, and this incurs the extremely wavelength-sensitive characteristics of the element.

In the realm of fiber optics, a tiny length of hi-bi (highly birefringent) optical fiber is capable, in principle, of performing an SOP transform if the incident linear light is intentionally to be aligned off-axis, preferably at a 45° angle from either principal axis of the hi-bi fiber. The two orthogonal components, or polarization modes, will beat along the fiber axis, so that the SOP of light will undergo all changes in half a beat-length. In actual practice, however, it scarcely appears practical to use a short hi-bi fiber section of very precise length to serve the purpose of a desired SOP transformation, particularly in view of an all-fiber optical circuitry wherein each fiber element is preferably in-line spliced at either end of the element. Like the case of bulk-optic wave plates, the SOP transform based on beating of polarization modes in hi-bi fiber is also inherently narrow-band, extremely sensitive to the operating wavelength and the length of the tiny fiber section.

It is on said background that this invention is brought into being in the spirit of the multifold advantageous features of the invention, e.g., the invented fiber-optic element is capable of performing a multitude of SOP transforms almost effortlessly without the need of tedious adjustment and aligning, the convenience for in-line use in an all-fiber optical network in which the invented fiber element can be spliced anywhere, and most importantly, the broad-band inherence of the invention whose working mechanism is totally novel as to be described in more detail subsequently.

SUMMARY OF THE INVENTION

According to one aspect of the present invention, a broad-band fiber-optic wave plate is provided, comprising a section of spun birefringent optical fiber, characterized in that said fiber-optic wave plate is a quarter wave plate, and is unspun at one end and fast-spun at the other end, with a slow variation of the spin-rate along the length of the fiber, and that said optical fiber has a working band-width essentially equal to that of the single-mode optical fiber.

According to another aspect of the present invention, a broad-band fiber-optic wave plate is provided, comprising a section of spun birefringent optical fiber, characterized in that said fiber-optic wave plate is a half wave plate, and is fast-spun at one end and oppositely fast-spun at the other end, with a slow variation of the spin-rate along the length of the fiber from fast to zero and thence continually from zero to fast in the opposite sense, and that said fast-spun end is the input whereon a linear light is incident, and said oppositely fast-spun end is the output wherefrom a linear light is emergent, and that when the half wave plate fiber is rotated by a certain angle, the change of orientation angle of the emergent linear light at the output is twice the rotation angle of the variably spun half wave plate fiber.

According to another aspect of the present invention, a broad-band fiber-optic wave plate is provided, comprising a section of spun birefringent optical fiber, characterized in that said fiber-optic wave plate is a fall wave plate, and is unspun at one end and also unspun at the other end, with a slow variation of the spin-rate along the length of the fiber from zero to fast and thence continually from fast to zero, and that said optical fiber has a working band-width essentially equal to that of the single-mode optical fiber.

According to another aspect of the present invention, a broad-band fiber-optic wave plate is provided, comprising a section of spun birefringent optical fiber, characterized in that said optical fiber is a fractional wave plate, and is unspun at one end and spun with a moderate rate at the other end, with a slow variation of the spin-rate along the length of the fiber from zero to a moderate value, and that said unspun end is the input whereon a linear light is incident, and said moderately spun end is the output wherefrom a single elliptical eigenmode is emergent. and that said optical fiber is broad-band, with a working band-width essentially equal to that of the single-mode optical fiber.

According to another aspect of the present invention, a method of fabricating any variety of the broad-band fiber-optic wave plate including quarter, half, full or fractional wave plate is provided, by way of pulling a heated birefringent preform with the aid of a fiber-drawing setup comprising a conventional fiber-drawing tower modified by the inclusion of a speed-controlled spinner on top of the tower and an apparatus for marking on the on-drawing fiber the point where the fiber starts spinning and the point where the fastest spinning is reached, with appropriate prescription of the fastest spin-rate, the speed of the linear drawing of the fiber, and the slowly varying spin-rate function, under the restrictive conditions that $L_b/L_s^f \gg 1$, $|d\tau(z)/dz| \ll \Delta$, where $L_b$ and $L_s^f$ denote respectively the unspun beat-length and the spin-pitch at the point of fastest spin-rate, $\Delta=4\pi^2[1+4(L_b/L_s^f)^{3/2}]$, and $\tau(z)$ represents the slowly varying spin-rate function.

According to another aspect of the present invention, a method of fabricating any variety of the broad-band fiber-optic wave plate including quarter, half, full or fractional wave plate is provided, using a section of birefringent optical fiber as the starting material, in conjunction with a special fiber-fabrication apparatus consisting of a moving microheater, a speed-controlled spinner, and a set of fasteners to fasten the fiber section, such that a locally heated region shifts its location along the fiber while the microheater is in motion, and is spun at a varying spin-rate according to the spin-rate function of the spinner, thereby making a variably-spun birefringent fiber as desired, provided that the fabrication process takes place under the restrictive conditions that $L_b/L_s^f\gg 1$, $|d\tau(z)/dz|\ll\Delta$, where $L_b$ and $L_s^f$ denote respectively the unspun beat-length and the spin-pitch at the point of fastest spin-rate, $\Delta=4\pi^2[1+4(L_b/L_s^f)^{3/2}]$, and $\tau(z)$ represents the slowly varying spin-rate function.

The present invention is to disclose the discovery that a birefringent optical fiber spun variably along its length behaves in its SOP transform function like a wave plate, either quarter wave plate or half, full, fractional wave plate, depending on the way that the spin-rate varies. Central to the description is the multitude of the SOP transforms existing in the invented fiber-optic quarter wave plate. This is because of the fact that, with the fiber-optic quarter wave plate acting as a building block, other fiber-optic wave plates can likewise be constructed in the form of variably spun fiber sections. Thus, from the results derived from a fiber-optic quarter wave plate, most inferences can be drawn about other fiber-optic wave plates.

The structural feature of a fiber-optic quarter wave plate is a section of variably spun birefringent optical fiber with a spin-rate varying from zero to fast, or conversely from fast to zero. Such special fiber is termed a quarter wave plate indeed not because of its structural appearance. In fact, while a conventional bulk-optic quarter wave plate is symmetrical, a fiber-optic quarter wave plate is asymmetrical, with respect to the input and output sides. The concerned asymmetrical fiber element is appropriately categorized as the fiber-optic counterpart of a symmetrical bulk-optic quarter wave plate for the reason that the fiber-optic and bulk-optic counterparts are all similar in their SOP transform functions, in which the linear-circular or circular-linear SOP transform exhibited by both is but one example to reveal the striking similarity.

With an extension fiber (or tail fiber) on either side, one being a length of unspun birefringent fiber and the other being a length of continually but unvaryingly fast-spun fiber, the invented fiber-optic quarter wave plate can be in-line spliced with other fiber elements in an all-fiber architecture in modern optical fiber communication and sensor technology. This is apparently one advantageous technological aspect in favor of the fiber wave plate. Most importantly, the fiber-optic quarter wave plate is superior to its bulk-optic counterpart in the bandwidth aspect, i.e., while the bulk-optic quarter wave plate is narrow-band, the fiber-optic quarter wave plate is broad-band, with a bandwidth essentially equal to the nominal single-mode operation range.

The broad-band inherence of fiber-optic wave plates can be explained by viewing its working mechanism that is drastically different from the working mechanism either of bulk-optic wave plates, or of sections of uniform hi-bi optical fiber. As afore-said, a conventional bulk-optic wave plate is narrow-band in its SOP transform performance because the performance requires a specified phase difference between the o-wave and the e-wave when they pass the wave plate, and this specified phase difference is strictly dependent on the operating frequency or wavelength. Meanwhile, a uniform hi-bi fiber section is also narrow-band in view of the beating pattern of the polarization modes that accounts the change of SOP along the fiber section. In distinctive contrast, in a wave plate fiber the input light gradually transforms its SOP through the slowly varying fiber structure until it reaches the output end where a certain SOP transform of light is completed.

Among immediate and potential applications of the invention, examples are provided by all-fiber electric-current sensors of the polarimetric and interferometric versions, the gyroscope, the coherence optical fiber communication, etc. Both polarimetric and interferometric electric-current sensors have successfully been constructed in the inventor's laboratory in which the invented fiber-optic quarter wave plate plays an indispensable role in achieving the observed long-term stability in current measurement with high precision. More description of the encouraging data on current measurement observed in the inventor's laboratory will be given subsequently in Detailed Description of the Invention.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE INVENTION

Figure 1:
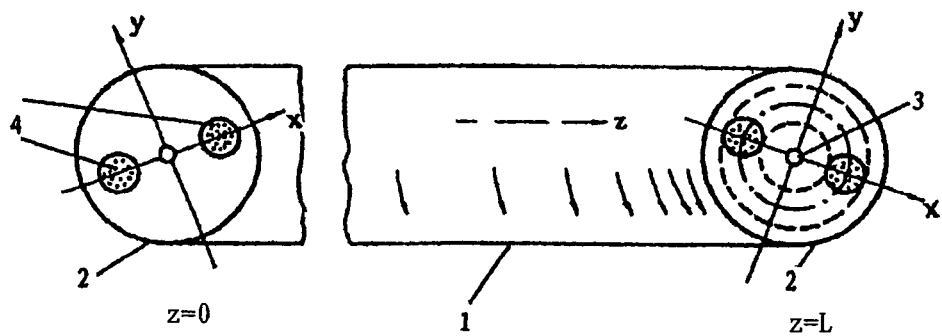
FIG. 1 is schematic diagram of fiber-optic quarter wave plate structure according to the first embodiment of the invention.

The initial idea leading to the invention of a fiber-optic quarter wave plate was just an intuition that, because the unspun end of the conceived fiber section favors one or the other principal-axis aligned linear light, while the fast-spun end of this fiber section favors a right or left circular light, it is reasonable to attempt converting a linear light incident onto the unspun end to become a circular light at the other fast-spun end, in view of the slow variation of the fiber structure from unspun to fast-spun. Iterative solutions of a set of differential equations with variable coefficients descriptive of lightwave evolution in a variably spun birefringent fiber were then derived and computer-aided to yield numerical data for the transformed light.

The numerical computation was formidably time-consuming, yet still scarcely interpretable in terms of SOP transform in a clear and unambiguous way. Fortunately enough, it was then discovered by the inventor that an asymptotic approach can be adopted that yields greatly simplified analytic solutions in closed form. The end result of this analytic framework based on asymptotic approximations is reduced to the following simple matrix formulation:

$$A(L) = T_{0 \to L} A(0) \tag{1}$$

where $A(0)$ and $A(L)$ are column matrices representing input and output light, respectively, and $T_{0 \to L}$ is a square matrix, called the transfer matrix, whose elements are functions of the structural parameters of the concerned variably spun birefringent fiber.

For illustration of the usefulness of Eq. (1), a zero-to-fast fiber-optic quarter wave plate is taken as an example. The asymptotic form of $T_{0 \to L}$ for this special fiber structure is given by:

$$T_{0 \to L} = \frac{1}{\sqrt{2}} \begin{bmatrix} e^{j\rho} & -e^{-j\rho} \\ -je^{j\rho} & e^{-j\rho} \end{bmatrix} \tag{2}$$

$$\rho = \int_0^L \pi [1 + 4(L_b/L_s)^2]^{1/2} dz \tag{2a}$$

where $\rho$ is the global structural parameter, with $L_s$, $L_b$ and $L$ denoting respectively the spin-rate function, the unspun beat-length, and the total length of the fiber.

According to Eq. (1), for a principal-axis x aligned linear light incident onto the input unspun end of the fiber quarter wave plate, the SOP transform is expressed analytically as:

$$A(0) = \begin{bmatrix} 1 \\ 0 \end{bmatrix} \tag{3}$$

$$A(L) = \frac{1}{\sqrt{2}} \begin{bmatrix} e^{j\rho} & -je^{-j\rho} \\ -je^{j\rho} & e^{j\rho} \end{bmatrix} \begin{bmatrix} 1 \\ 0 \end{bmatrix} = \frac{1}{\sqrt{2}} \begin{bmatrix} 1 \\ j \end{bmatrix} e^{j\rho} \tag{4}$$

An x-aligned linear light at z=0 is thus transformed into a right circular light with a phase shift given by the exponential term $e^{j\rho}$. Other SOP transforms of a fiber-optic quarter wave plate can be derived in a similar way. Eq. (2) is seen to be the second entry of Table 1 which, as a summary of said asymptotic theoretical approach to analyzing the SOP transform problems relating to fiber-optic wave plates, also includes other transfer matrices of practical interest in the present invention.

TABLE 1

Transform Behaviors of the PPT Varieties

| | Transfer Matrix in Local Coordinates (Asymptotic) | Equivalent Retarder-Rotator in Local Coordinates |
|---|---|---|
| λ/4 wave plate (fast → zero PPT) | $\frac{1}{\sqrt{2}} \begin{bmatrix} e^{j\rho} & -je^{j\rho} \\ -je^{-j\rho} & e^{-j\rho} \end{bmatrix}$ | R = π/2<br>Ω = −ρ<br>Φ = ρ − π/4 |

TABLE 1-continued

Transform Behaviors of the PPT Varieties

| | Transfer Matrix in Local Coordinates (Asymptotic) | Equivalent Retarder-Rotator in Local Coordinates |
|---|---|---|
| λ/4 wave plate (fast → zero PPT) | $\frac{1}{\sqrt{2}} \begin{bmatrix} e^{j\rho} & -je^{-j\rho} \\ -je^{j\rho} & e^{-j\rho} \end{bmatrix}$ | R = π/2<br>Ω = ρ<br>Φ = −π/4 |
| half-wave plate | $j \begin{bmatrix} \sin\rho & -\cos\rho \\ -\cos\rho & -\sin\rho \end{bmatrix}$ | R = π<br>Ω + 2Φ = ρ − π/2 |
| full-wave plate | $\begin{bmatrix} \cos\rho & \sin\rho \\ -\sin\rho & \cos\rho \end{bmatrix}$ | R = 2π<br>Ω = π − ρ |

Note:
In the right column of Table 1, R, Ω, and Φ denote respectively the retardation, rotation and fast-axis angle with respect to local coordinates, in the retardor-rotator formulation in conventional optics.

From the practical viewpoint, the invention aims at providing a class of fiber-optic wave plates with a broad band of the working wavelength, suitable for in-line use, and capable of performing a multitude of useful SOP transforms. The four varieties of broad-band fiber-optic wave plate of practical interest are quarter, full, half, and fractional wave plates, with each kind of wave plate featured by its own structural configuration and SOP transform functions.

According to the first embodiment of the invention, a broad-band fiber-optic wave plate is provided which is characterized by the specification of a broad-band fiber-optic quarter wave plate, called a PPT (short for practical polarization transformer) or simply PT. As afore-said, a fiber-optic wave plate is a section of variably spun birefringent optical fiber. The structural feature of a quarter wave plate is that the spin-rate varies slowly along the fiber section from zero to fast, or conversely from fast to zero. A PPT is thus an asymmetrical fiber structure comprising four different versions in view of the circumstance that either the unspun end or the fast-spun end can act as the input, and in each case, the sense of spin can be either clockwise or anticlockwise.

With reference to FIG. 1, a schematic diagram of the structure of a broad-band fiber-optic quarter wave plate is shown in the form of a variably spun birefringent optical fiber with a spin-rate varying from zero to fast, wherein the reference number 1 indicates a section of variably spun birefringent optical fiber, the reference number 2 indicates a cross-section of said fiber, the reference number 3 indicates the fiber core, the reference number 4 indicates stress-applying region, and the curved arrows symbolically show the spin-rate being slow or fast according to the sequence of arrows being sparse or dense. As shown in FIG. 1, an unspun end is at z=0, and a fast-spun end is at z=L.

Detailed description of the multitude of SOP transforms of a fiber-optic quarter wave plate and a bulk-optic quarter wave plate will be succinctly listed in Tables 2 A, B and 3.

The invented fiber-optic quarter wave plate (PPT), either zero-to-fast or fast-to-zero, is capable of performing a great multitude of SOP transform functions which exist likewise in its bulk-optic counterpart, despite of the apparent structural difference of the two devices that one is asymmetrical while the other is symmetrical. The linear-circular or circular-linear SOP transform exhibited in a PPT reveals in particular a striking similarity between the two counterpart device elements of concern, inasmuch as this SOP transform has already been known in conventional bulk optics for long since the old time. The SOP transform relating to a random linear light, having been found first in fiber optics, but scarcely known in bulk optics before, was then searched and found also in this optics category of old history (see last entry in Table 3). While recognizing the similarity in the multitude of SOP transforms in the corresponding elements, it is important to notice that a fiber-optic PPT is broad-band in transform performance, in distinctive contrast to the narrow-band performance of its bulk-optic counterpart element in similar SOP transform. This is a major favorable characteristics of the PPT in view of its application in communication and sensor technology.

The multitude of SOP transforms of a fiber-optic quarter wave plate listed in Tables 2A and 2B can be compared with those similar SOP transforms of a conventional bulk-optic quarter wave plate as listed in Table 3. In principle, there exist limitless varieties of SOP transforms in either fiber optics or bulk optics, corresponding to limitless possibilities in specifying the incident light as an initial condition of the initial-value problem associated with the quarter wave plate. In the light of usefulness in application, the collection of SOP transforms that appear in these tables is believed to be practically complete.

TABLE 2A

Polarization Transforms of Fiber-Optic Quarter Waveplate (zero-to-fast spun)

| Transformation process | Input Light At z = 0 | Output Light at z = L | Reference Axes |
|---|---|---|---|
| single-supermode | x-aligned linear $\begin{bmatrix}1\\0\end{bmatrix}$ | right circular $\frac{1}{\sqrt{2}}\begin{bmatrix}1\\j\end{bmatrix}e^{j\rho}$ | local principal axes |
| single-supermode | y-aligned linear $\begin{bmatrix}0\\1\end{bmatrix}$ | left circular $\frac{1}{\sqrt{2}}\begin{bmatrix}1\\-j\end{bmatrix}e^{-j(\rho-\pi/2)}$ | local principal axes |
| Dual-supermode | right circular $\frac{1}{\sqrt{2}}\begin{bmatrix}1\\j\end{bmatrix}$ | specific linear $\begin{bmatrix}\cos(\pi/2-\rho)\\\sin(\pi/2-\rho)\end{bmatrix}e^{j\pi/2}$ | local principal axes |
|  | left circular $\frac{1}{\sqrt{2}}\begin{bmatrix}1\\-j\end{bmatrix}$ | specific linear $\begin{bmatrix}\cos(-\rho)\\\sin(-\rho)\end{bmatrix}$ | local principal axes |
|  | specific linear $\frac{1}{\sqrt{2}}\begin{bmatrix}1\\1\end{bmatrix}$ | specific linear $\begin{bmatrix}\cos(\pi/4-\rho)\\\sin(\pi/4-\rho)\end{bmatrix}e^{j\pi/4}$ | local principal axes |
|  | arbitrary linear $\begin{bmatrix}\cos\theta\\\sin\theta\end{bmatrix}$ | equal-power division $\|A_x\|^2 = \|A_y\|^2 = 1/2$ $\Omega = 2\theta - \pi/2$ | axes rotated by $-\rho$ |

Note:
In the table, it is tacitly assumed that spinning of the PPT fiber is in the + or clockwise sense. For − or anticlockwise spinning, x-aligned linear light and y-aligned linear light listed in the table are to be interchanged, and linear light of specific orientation is to become the normal to this light. If both the spinning of PPT fiber and the circling of a circular light change their senses, then the transformed light at output will remain unchanged. According to Eq. (2a), the parameter ρ is a function of $L_s$, $L_b$, and L, characteristic of the structural features of the PPT.

TABLE 2B

Polarization Transforms of Fiber-Optic Quarter Waveplate (fast-to-zero spun)

| Transformation process | Input Light at z = 0 | Output Light at z = L | Reference Axes |
|---|---|---|---|
| single-supermode | right circular $\frac{1}{\sqrt{2}}\begin{bmatrix}1\\j\end{bmatrix}$ | x-aligned linear $\begin{bmatrix}1\\0\end{bmatrix}e^{j\rho}$ | local principal axes |
| single-supermode | left circular $\frac{1}{\sqrt{2}}\begin{bmatrix}1\\-j\end{bmatrix}$ | y-aligned linear $\begin{bmatrix}0\\1\end{bmatrix}e^{-j(\rho+\pi/2)}$ | local principal axes |
| Dual-supermode | specific linear $\begin{bmatrix}\cos(\rho-\pi/2)\\\sin(\rho-\pi/2)\end{bmatrix}$ | right circular $\frac{1}{\sqrt{2}}\begin{bmatrix}1\\j\end{bmatrix}$ | local principal axes |
|  | specific linear $\begin{bmatrix}\cos\rho\\\sin\rho\end{bmatrix}$ | left circular $\frac{1}{\sqrt{2}}\begin{bmatrix}1\\-j\end{bmatrix}$ | local principal axes |
|  | arbitrary linear $\begin{bmatrix}\cos\theta\\\sin\theta\end{bmatrix}$ | equal-power division $\|A_x\|^2 = \|A_y\|^2 = 1/2$ $\Omega = \pi/2 + 2\rho - 2\theta$ | local principal axes |

Note:
Same as for Table 2A.

TABLE 3

Polarization Transforms of Bulk-Optic Quarter Waveplate

| Transformation process | Input Light at z = 0 | Output Light at z = L | Reference Axes |
|---|---|---|---|
| Dual-eigenmodes | right circular $\frac{1}{\sqrt{2}}\begin{bmatrix}1\\j\end{bmatrix}$ | specific linear $\frac{1}{\sqrt{2}}\begin{bmatrix}1\\-1\end{bmatrix}e^{j\pi/4}$ | optic-axis horizontal |
|  | left circular $\frac{1}{\sqrt{2}}\begin{bmatrix}1\\-j\end{bmatrix}$ | specific linear $\frac{1}{\sqrt{2}}\begin{bmatrix}1\\1\end{bmatrix}e^{j\pi/4}$ | optic-axis horizontal |
|  | π/4 inclined linear $\frac{1}{\sqrt{2}}\begin{bmatrix}1\\1\end{bmatrix}$ | right circular $\frac{1}{\sqrt{2}}\begin{bmatrix}1\\j\end{bmatrix}e^{j\pi/4}$ | optic-axis horizontal |
|  | π/4 inclined linear $\frac{1}{\sqrt{2}}\begin{bmatrix}1\\-1\end{bmatrix}$ | left circular $\frac{1}{\sqrt{2}}\begin{bmatrix}1\\-j\end{bmatrix}e^{j\pi/4}$ | optic-axis horizontal |
|  | arbitrary linear $\begin{bmatrix}\cos\theta\\\sin\theta\end{bmatrix}$ | equal-power division $\|A_x\|^2 = \|A_y\|^2 = 1/2$ $\Omega = -2\theta$ | axes rotated by $-\pi/4$ |

Note:
For the optic-axis to be vertical, the transformed linear light from right and left circular light will interchange, while the transformed right circular light from a π/4-inclined linear light will change into left circular. For a rotation of coordinate axes by π/4, the "equal-power-division" behavior still holds, with the phase-difference relation changed to 2 θ + π.

It is noted herein below that similar optical fiber structure, then called PPC (short for "passive polarization control"), was revealed in a previous U.S. Pat. No. 4,943,132 (Jul. 24, 1990) of the same inventor. But what was concerned in the previous invention is a variably spun birefringent optical fiber with a spin-rate varying from fast to zero which is capable of controlling in a passive way an unpredictable randomly-oriented linear light at the input z=0 with the result that the continuum of transformed elliptical light (with linear light and circular light regarded as the two limiting cases) all become uniquely oriented at 45° from either local principal axis at the output z=L. The theoretical prediction of this result was expressed as an "equal-power division" relation and a phase-difference relation:

$$|A_x(L)|^2 = |A_y(L)|^2 = 0.5 \quad (5)$$

$$\Omega = \pi/2 + 2\rho - 2\theta \quad (6)$$

where $\theta$ is a random parameter denoting the orientation angle of the incident linear light, and $\rho$ is the global structural parameter given by Eq. (2a). According to Eq. (6), if $\theta$ is not random, but takes a specific value as given below by Eq. (7), then the result will be:

$$\theta = \rho \quad (7)$$

$$\Omega = \pi/2 \quad (8)$$

which shows that the incident linear light of the specified orientation will be converted to a circular light at the output, in the effect that, under the condition specified by Eq. (7), the concerned variably spun birefringent optical fiber possesses the function of linear-circular transformation.

At that early time (1990) when said U.S. Pat. No. 4,943,132 was issued, it was naturally beyond the spirit and scope of the inventor's discovery to recognize that said peculiar polarization control (PPC) relating to a randomly oriented linear light is but one of the multitude of SOP transforms of a fiber-optic quarter wave plate, PPT or PT. The inventor came to this recognition only through a long and uneven course of analytic study afterwards, with the indispensable aid of the exceedingly effective asymptotic method. The concerned peculiar SOP transform is now taken as the last entry in Table 2B, which also includes the SOP transform specified by Eqs. (7) and (8) relating to a fast-to-zero fiber-optic quarter wave plate.

Fabrication of the invented broad-band fiber-optic wave plate can be performed in the conventional way by using a birefringent preform drawn by a fiber-drawing tower incorporated with a variable-speed spinner on top of the setup. A nonconventional way is to adopt the moving microheater technique devised by the same inventor, using a length of birefringent fiber as the starting material. For detailed description of the second nonconventional fabrication technique for making PPT, see the U.S. Pat. No. 5,096,312 granted to the inventor on Mar. 17, 1992.

Figure 2A:
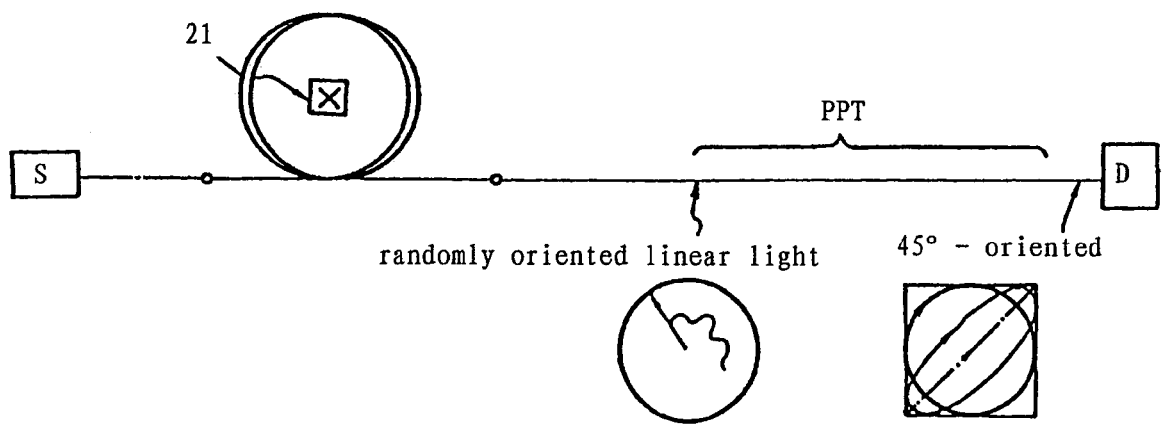
FIG. 2A is schematic diagram of all-fiber electric-current sensor of the polarimetric version employing fiber-optic quarter wave plate as shown in FIG. 1.

An application example of the fiber-optic quarter wave plate is provided by a polarimetric electric-current sensor whose schematic diagram is shown in FIG. 2A, wherein S is light source, the coiled optical fiber encircling the electric current busbar 21 is a length of CPM (circular-polarization-maintaining) fiber invented by the same inventor holding a U.S. Pat. No. 5,452,394 (1995), and PPT is a fast-to-zero fiber-optic quarter wave plate whose function is to make an orientation-disordered linear light ordered before being detected by a photodiode D. The incident linear light is disordered in orientation because the electric current in the busbar 21 varies in a random way so that the Faraday rotation angle follows also in a random way. The PPT converts a linear light of any orientation to light in the continuum of elliptical light uniquely oriented by 45° with respect to either local principal axis at the output. FIG. 2A represents an utmostly simple all-fiber optical architecture for electric current sensing, wherein a single piece of PPT is used to replace a body of bulk optics employed in a customary electric-current sensor, comprising a Wollaston prism in corporation with a pair of photodetectors of essentially identical characteristics, plus the ratio-electronics for signal processing. A setup of the polarimetric electric-current sensor as shown in FIG. 2A was established in the inventor's laboratory yielding encouraging data in preliminary experiment.

Figure 2B:
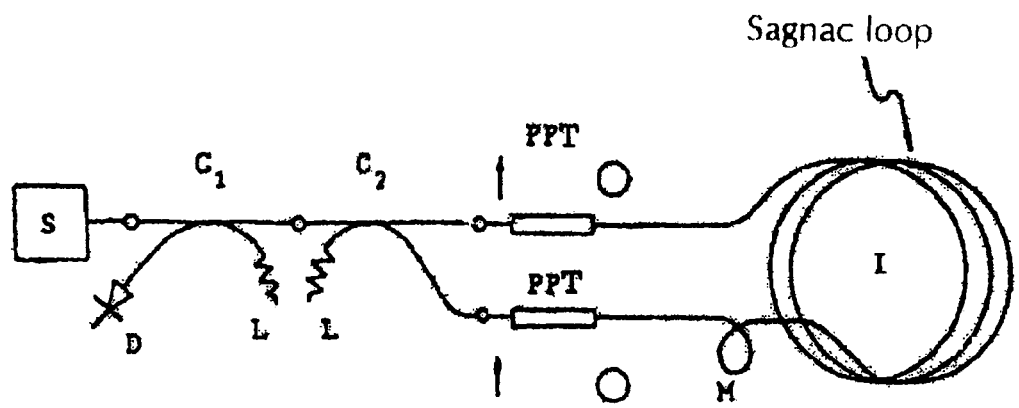
FIG. 2B is schematic diagram of all-fiber electric-current sensor of the Sagnac interferometric version employing fiber-optic quarter wave plate as shown in FIG. 1.

A second application example of the fiber-optic quarter wave plate is provided by an interferometric electric-current sensor whose schematic diagram is shown in FIG. 2B, wherein S is light source, $C_1$ and $C_2$ are polarization-maintaining couplers, two PPTs are fiber-optic quarter wave plates, M is modulator, and the sensing coil around the electric-current busbar I is a length of CPM fiber. The scheme looks essentially like an all-fiber Sagnac interferometer for gyroscope, but not exactly for the inclusion of two PPTs and the use of CPM fiber for the sensing coil. It is worth emphasizing herewith that the CPM fiber is believed to be a unique choice to serve the purpose of electric current sensing. A setup of the interferometric electric-current sensor recently constructed in the inventor's laboratory was put out to an electric power substation in the university's campus for field trial. Measurement data taken by an authoritative institution in Shanghai show that the interferometric sensor under test has reached a fairly high precision for a large electric current in busbar.

Figure 2C:
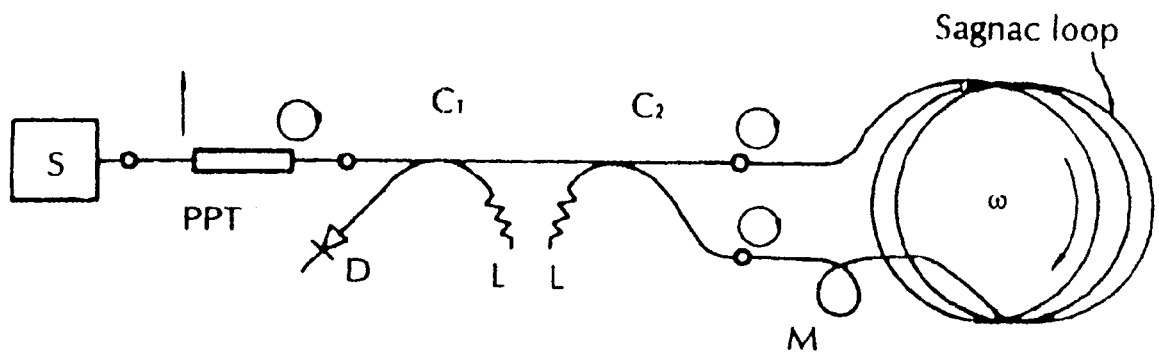
FIG. 2C is schematic diagram of all-fiber gyroscopic of the Sagnac interferometric version employing fiber-optic quarter wave plate as shown in FIG. 1.

A third application example of the fiber-optic quarter wave plate is provided by a proposed all-fiber gyroscopic architecture whose schematic diagram is shown in FIG. 2C, wherein circular light is employed in the main body of the architecture, and one PPT of zero-to-fast version is introduced in order to convert linear light from the source to circular light that feeds the all-fiber circuitry. Potential feasibility of the proposed scheme using circular light is easy splicing of the device terminals, without such difficulty like principal-axis aligning occurring otherwise in an optical circuitry using the linear light. In FIG. 2C, $\omega$ denotes rotational rate of the Sagnac loop. Problem regarding practicality of the proposed scheme yet awaits answer by way of careful experiment.

Figure 2D:
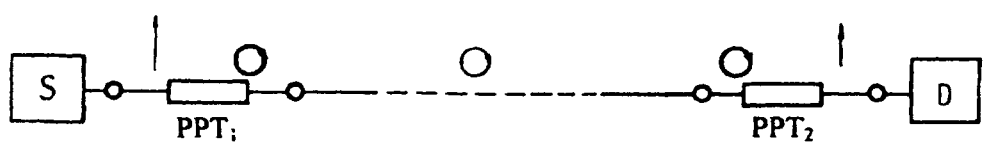
FIG. 2D is schematic diagram of coherence communication system employing fiber-optic quarter wave plate as shown in FIG. 1.

A fourth application example of the fiber-optic quarter wave plate is provided by a proposed coherence communication system, for which a schematic drawing is given by FIG. 2D, where S and D are light source and photodetector, respectively, and where $PPT_1$ is a zero-to-fast fiber-optic quarter wave plate whose function is to convert linear light from the source to circular light to feed the transmission line, and $PPT_2$ is a fast-to-zero fiber optic quarter wave plate whose function is to convert at the receiving end the circular light back to linear light before photodetection. An all-fiber coherence communication system is a long wishful objective in the R&D of optical fiber transmission, but remains a hard-nut technological problem even by now. A coherence system is expected to have an improvement in sensitivity by 15-20 dB, but this probable advantage is now not so attractive since the advent of fiber amplifier. The frequency-selective feature remains a major impetus for the continuing effort in this research area. The initial idea of a coherence system due to L. Jeunhomme and M. Monerie (*Electron. Lett.*, vol. 16, pp. 921-922, 1980) comprises a transmission line using twisted fiber (conventional single-mode fiber undergoing a post-draw twist at cool state) incorporated with bulk-optic quarter wave plates at both ends. Such system is impractical for a number of obvious reasons. The presently proposed scheme shown in FIG. 2D employs two PPTs and a length of CPM fiber, both being the inventions of the same inventor. For a discussion of this scheme, see U.S. Pat. No. 5,452,394 (1995).

Figure 3:
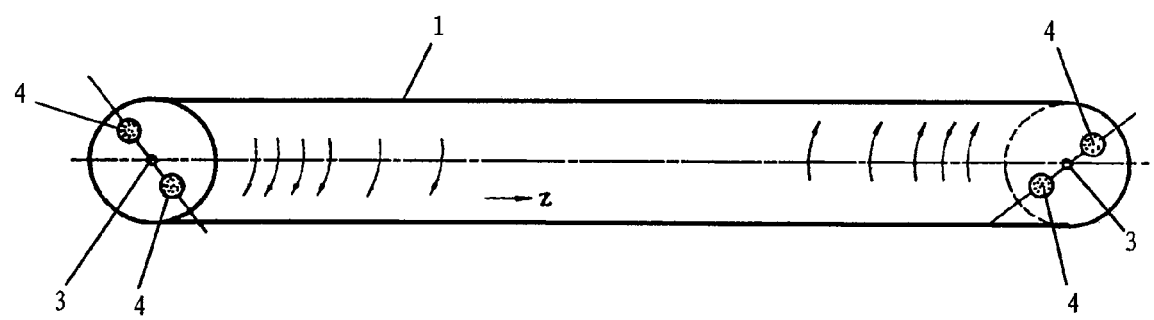
FIG. 3 is schematic diagram of fiber-optic half wave plate structure according to the second embodiment of the invention.

According to the second embodiment of the invention, a broad-band fiber-optic wave plate is provided which is characterized by the specification of a broad-band fiber-optic half wave plate. With reference to FIG. 3, such fiber-optic wave plate is a section of spun birefringent optical fiber with one end being fast-spun and the other end being fast-spun but in opposite sense, and with a spin-rate varying slowly from fast to zero, and thence in opposite sense of spinning from zero to fast. The two subsections of fiber, fast-to-zero and zero-to-fast, are not required to be exactly antisymmetrical in their spin-rate functions. What is required is that both fast-spun ends are spun at sufficiently fast rates, and the variation of the spin-rate is always slow enough. Two behaviors of a fiber-optic half wave plate are of interest. One behavior is that a linear light incident onto one end of this wave plate is transformed into a linear light at the other end with a phase shift of $\pi$. Another behavior is that, when this half-wave-plate fiber is rotated by a certain angle, the change of orientation angle of the emergent linear light at the output is twice the rotation angle of the wave plate.

Figure 4A:
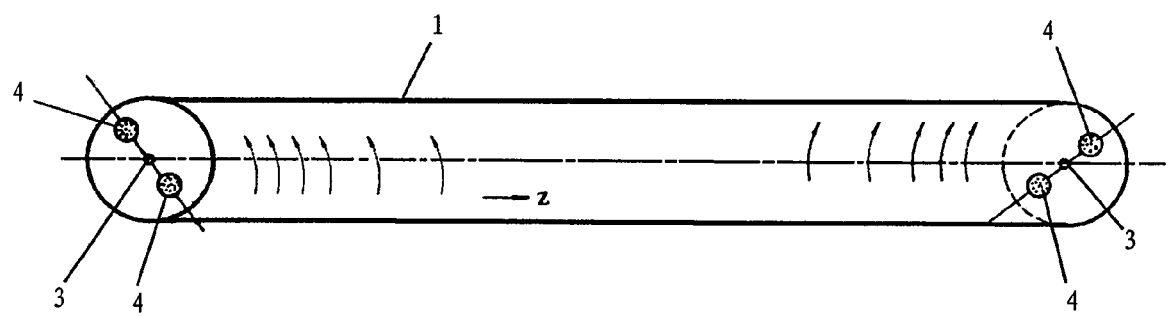
FIGS. 4A and 4B are schematic diagrams of fiber-optic full wave plate structures according to the third embodiment of the invention.
Figure 4B:
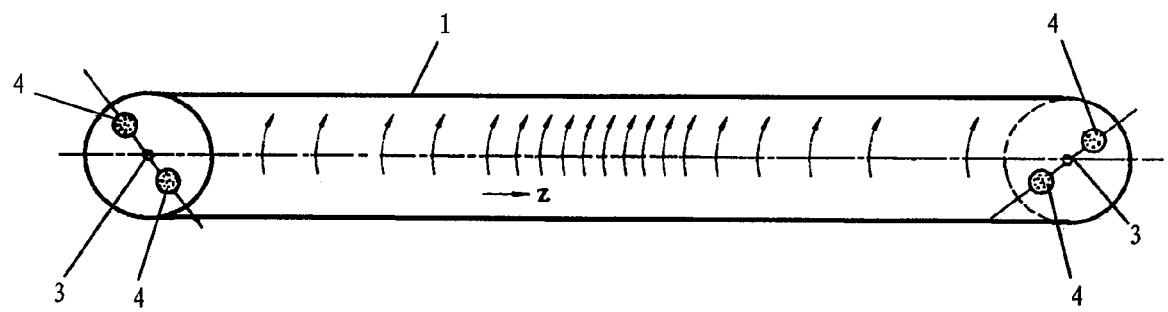

According to the third embodiment of the invention, a broad-band fiber-optic wave plate is provided which is characterized by the specification of a broad-band fiber-optic full wave plate. With reference to FIG. 4A, one variety of fiber-optic full wave plate is a section of spun birefringent optical fiber with one end being fast-spun and the other end being fast-spun in the same sense, wherein the spin-rate variation from fast to zero in the first subsection and in the same sense from zero to fast in the second subsection is always sufficiently slow over the entire length of the fiber. With reference to FIG. 4B, another variety of fiber-optic full wave plate is a section of birefringent optical fiber whose spin-rate varies from zero to fast in the first subsection and thence continuously from the attained fast value to zero. The SOP transforms of interest with respect to said two varieties of fiber-optic full wave plate are listed in Table 4.

TABLE 4

Polarization Transforms of Fiber-Optic Full Waveplate

| Spin-Rate Variation of Full Waveplate | Input Light at z = 0 | Output Light at z = L | Reference Axes |
|---|---|---|---|
| fast-to-zero and thence zero-to-fast of same sense | right circular $\frac{1}{\sqrt{2}}\begin{bmatrix}1\\j\end{bmatrix}$ | right circular $\frac{1}{\sqrt{2}}\begin{bmatrix}1\\j\end{bmatrix}e^{j\rho}$ | local principal axes |
| | left circular $\frac{1}{\sqrt{2}}\begin{bmatrix}1\\-j\end{bmatrix}$ | left circular $\frac{1}{\sqrt{2}}\begin{bmatrix}1\\-j\end{bmatrix}e^{-j\rho}$ | local principal axes |
| zero-to-fast and thence fast-to-zero | $\phi$-inclined linear $\begin{bmatrix}\cos\phi\\\sin\phi\end{bmatrix}$ | ($\phi$-$\rho$)-inclined linear $\begin{bmatrix}\cos(\phi-\rho)\\\sin(\phi-\rho)\end{bmatrix}$ | local principal axes |
| | x-aligned linear $\begin{bmatrix}1\\0\end{bmatrix}$ | x-aligned linear $\begin{bmatrix}1\\0\end{bmatrix}e^{j\rho}$ | local principal axes |
| | y-aligned linear $\begin{bmatrix}0\\1\end{bmatrix}$ | y-aligned linear $\begin{bmatrix}0\\1\end{bmatrix}e^{-j\rho}$ | local principal axes |

Note:
same as for table 2A.

Figure 5:
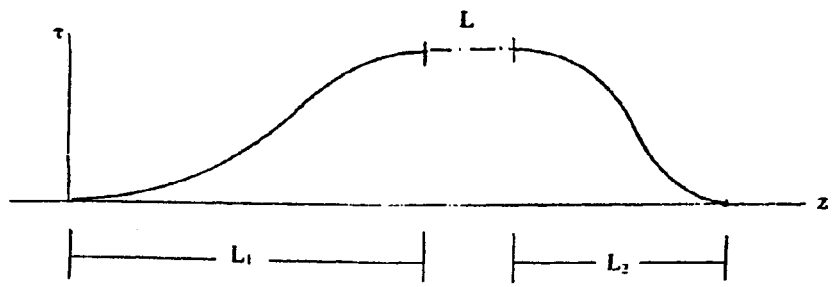
FIG. 5 is spin-rate function of fiber-optic full wave plate shown in 4B.

FIG. 5 depicts the spin-rate function of said second variety of fiber-optic full wave plate. This kind of full wave plate has been found useful in the inventor's laboratory in structuring an interferometric electric-current sensor. In FIG. 5, $\tau$ is spin-rate, $L_1$ and $L_2$ are respectively lengths of the rising and falling sub-sections of the full wave plate fiber, and L is an in-between extension fiber being spun continuously at the fastest spin-rate. Note that $L_1$ and $L_2$ need not to be equal, provided only that the spin-rate-variation is all-way sufficiently slow.

The fiber-optic half and full wave plates shown in FIG. 3 and FIGS. 4A and 4B, respectively, can be viewed as a composite fiber structure comprising two specified quarter wave plates in cascade. Thus, in FIG. 3 the fiber-optic half wave plate is a composite fiber structure comprising two subsections, one being a fast-to-zero quarter wave plate which converts a circular light to a principal-axis aligned linear light, and the other is a zero-to-fast quarter wave plate which converts said principal-axis aligned linear light to a circular light at the output of the composite fiber section. Because the spin rates of the two fiber subsections, or two quarter wave plates, are in opposite senses, the emergent light is left circular if the incident light is right circular, or vice versa, for the composite half wave plate. See Table 2A and 2B for the relevant mathematical expressions.

With reference to FIGS. 4A and 4B, each fiber-optic variety of full wave plates comprises two subsections in the form of two specified fiber-optic quarter wave plates. This circumstance may appear irrational if viewing from the standpoint of bulk optics, inasmuch as the thickness of a bulk-optic full wave plate should be four times of the thickness of a bulk-optic quarter wave plate. It is therefore worth emphasizing again that, despite all similarities in the SOP transforms existing in fiber optics and bulk optics, the concerned two kinds of wave plates actually work on entirely different mechanisms and naturally are distinctively different in their structural configurations, with the important result that the fiber-optic wave plate is broad-band while its bulk-optic counterpart is narrow-band.

Figure 6:
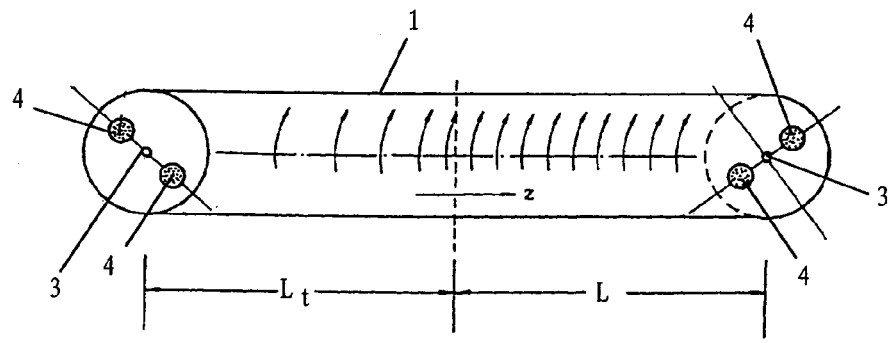
FIG. 6 is schematic diagram of fiber-optic fractional wave plate according to the fourth embodiment of the invention.

According to the fourth embodiment of the invention, a broad-band fiber-optic wave plate is provided which is characterized by the specification of a broad-band fiber-optic fractional wave plate. Shown in FIG. 6 is said fiber structure, whose spin-rate varies slowly from zero to a moderate value, where $L_\tau$ is the section of variable spin-rate, and L is a length of extension fiber (or tail fiber) of an unvarying moderate rate. The function of such fiber-optic fractional wave plate is similar to that of a bulk-optic fractional wave plate, which is to convert a principal-axis aligned linear light into an elliptical light of specific orientation and ellipticity.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A broad-band fiber-optic wave plate, comprising a section of spun birefringent optical fiber, characterized in that said fiber-optic wave plate is a half wave plate, and is fast-spun at one end and oppositely fast-spun at the other end, with a slow variation of the spin-rate along the length of the fiber from fast to zero and thence continually from zero to fast in the opposite sense, and that said fast-spun end is the input whereon a linear light is incident, and said oppositely fast-spun end is the output wherefrom a linear light is emergent, and that when the half wave plate fiber is rotated by a certain angle, the change of orientation angle of the emergent linear light at the output is twice the rotation angle of the variably spun half wave plate fiber.

2. A broad-band fiber-optic wave plate, comprising a section of spun birefringent optical fiber, characterized in that said fiber-optic wave plate is a full wave plate, and is unspun at one end and also unspun at the other end, with a slow variation of the spin-rate along the length of the fiber from zero to fast and thence continually from fast to zero, and that said optical fiber has a working band-width essentially equal to that of the single-mode optical fiber.

3. A broad-band fiber-optic wave plate according to claim 2, characterized in that one said unspun end is the input whereon a principal-axis x aligned linear light $$\begin{bmatrix} 1 \\ 0 \end{bmatrix}$$

is incident, and the other said unspun end is the output wherefrom a linear light $$\begin{bmatrix} 1 \\ 0 \end{bmatrix} e^{j\rho}$$

is emergent and aligned along the same principal-axis x, where $e^{j\rho}$ is a phase factor and $\rho$ is the global structural parameter dependent on the spin-pitch function, the unspun beat-length, and the total length of the variably spun full wave plate fiber.

4. A broad-band fiber-optic wave plate according to claim 2, characterized in that one said unspun end is the input whereon a principal-axis y aligned linear light $$\begin{bmatrix} 0 \\ 1 \end{bmatrix}$$

is incident, and the other said unspun end is the output wherefrom a linear light $$\begin{bmatrix} 0 \\ 1 \end{bmatrix} e^{-j\rho}$$

is emergent and aligned along the same principal-axis y, where $e^{-j\rho}$ is a phase factor and $\rho$ is the global structural parameter dependent on the spin-pitch function, the unspun beat-length, and the total length of the variably spun full wave plate fiber.

5. A broad-band fiber-optic wave plate, comprising a section of spun birefringent optical fiber, characterized in that said optical fiber is a fractional wave plate, and is unspun at one end and spun with a moderate rate at the other end, with a slow variation of the spin-rate along the length of the fiber from zero to a moderate value, and that said unspun end is the input whereon a principal-axis aligned linear light is incident, and said moderately spun end is the output wherefrom a single elliptical eigenmode is emergent, and that said optical fiber is broad-band, with a working band-width essentially equal to that of the single-mode optical fiber.

6. A method of fabricating any variety of the broad-band fiber-optic wave plate including quarter, half, full or fractional wave plate, by way of pulling a heated birefringent preform with the aid of a fiber-drawing setup comprising a conventional fiber-drawing tower modified by the inclusion of a speed-controlled spinner on top of the tower and an apparatus for marking on the on-drawing fiber the point where the fiber starts spinning and the point where the fastest spinning is reached, with appropriate prescription of the fastest spin-rate, the speed of the linear drawing of the fiber, and the slowly varying spin-rate function, under the restrictive conditions that $L_b/L_s^f \ll 1$, $|d\tau(z)/dz| \ll \Delta$, where $L_b$ and $L_s^f$ denote respectively the unspun beat-length and the spin-pitch at the point of fastest spin-rate, $\Delta = 4\pi^2[1+4(L_b/L_s^f)^{3/2}]$, and $\tau(z)$ represents the slowly varying spin-rate function.

7. A method of fabricating any variety of the broad-band fiber-optic wave plating including quarter, half, full or fractional wave plate, using a section of birefringent optical fiber as the starting material, in conjunction with a special fiber-fabrication apparatus consisting of a moving microheater, a speed-controlled spinner, and a set of fasteners to fasten the fiber section, such that a locally heated region shifts its location along the fiber while the microheater is in motion, and is spun at varying spin-rate according to the spin-rate function of the spinner, thereby making a variably-spun birefringent fiber as desired, provided that the fabrication process takes place under the restrictive conditions that $L_b/L_s^f \ll 1$, $|d\tau(z)/dz| \ll \Delta$, where $L_b$ and $L_s^f$ denote respectively the unspun beat-length and the spin-pitch at the point of fastest spin-rate, $\Delta = 4\pi^2[1+4(L_b/L_s^f)^{3/2}]$, and $\tau(z)$ represents the slowly varying spin-rate function.

\* \* \* \* \*